(12) United States Patent
Vergopoulou-Markessini et al.

(10) Patent No.: US 6,579,963 B1
(45) Date of Patent: Jun. 17, 2003

(54) BONDING RESINS

(75) Inventors: Efthalia Vergopoulou-Markessini, Thessaloniki (GR); Sophia Tsiantzi, Thessaloniki (GR)

(73) Assignee: Enigma N.V.

( * ) Notice: Subject to any disclaimer, the term of this patent is extended or adjusted under 35 U.S.C. 154(b) by 0 days.

(21) Appl. No.: 09/807,765

(22) PCT Filed: Oct. 15, 1999

(86) PCT No.: PCT/GR99/00040

§ 371 (c)(1),
(2), (4) Date: Jun. 6, 2001

(87) PCT Pub. No.: WO00/23490

PCT Pub. Date: Apr. 27, 2000

Related U.S. Application Data

(60) Provisional application No. 60/104,784, filed on Oct. 19, 1998.

(30) Foreign Application Priority Data

Oct. 19, 1998 (GB) .............................................. 9822801

(51) Int. Cl.⁷ ........................... C08G 14/04; C08G 8/20
(52) U.S. Cl. ....................... 528/155; 528/129; 528/230; 525/480; 525/507
(58) Field of Search ................................ 528/155, 129, 528/230; 525/480, 507

(56) References Cited

U.S. PATENT DOCUMENTS

| | | | |
|---|---|---|---|
| 4,209,647 A | 6/1980 | Gallivan et al. | 568/762 |
| 4,942,269 A | 7/1990 | Chum et al. | 585/240 |
| 5,202,403 A | 4/1993 | Doering | 527/403 |
| 5,235,021 A | 8/1993 | Chum et al. | 528/129 |

FOREIGN PATENT DOCUMENTS

| | | |
|---|---|---|
| AU | 492815 | 10/1976 |
| EP | 0729814 | 9/1996 |

OTHER PUBLICATIONS

Chen, C.M. "Gluability of Copolymer Resins Having Higher Replacement of Phenol by Southern Pine Foliage ... Composite Panels" Holzforschung, vol. 47, p. 72–75, (1993).

Chen, C.M. "State of the Art Report: Adhesives from Renewable Resources" Holzforschung und Holzverwertung, vol. 4, p. 58–60, (1996).

Chen, C.M. "A Hulluva Switch: Inventor Finds Value in Peanut Hulls" The University of Georgia, Research Reporter, p. 12–13.

Diebold, J. et al. "Engineering Aspects of the Vortex Pyrolysis Reactor to Produce Primary ... Adhesives" Research in Thermochemical Biomass Conversion, Eds. Bridgwater, A.V. et al. p. 609–628, (1988).

Chum, H. et al. "Biomass Pyrolysis Oil Feedstocks for Phenolic Adhesives" Adhesives from Renewable Resources, Eds. Hemingway, R. et al., p. 135–151, (1989).

Chum, H.L. et al. "Inexpensive Phenol Replacements from Biomass" Energy from Biomass and Wastes XV, Eds. Klass, D.L., p. 531–540, (1991).

Forss, K.G. et al. "Finnish Plywood, Particleboard, and Fiberboard Made with a Lignin–Base Adhesive" Forest Products Journal, vol. 29, No. 7, p. 39–43, (1979).

Chen, C.M. et al. "Gluability of Kraft Lignin Copolymer Resins on Bonding Southern Pine Plywood" Holzforschung, vol. 49, No. 2, p. 153–157, (1995).

Senyo, W.C. et al. "The Use of Organosolv Lignin to Reduce Press Vent Formaldehyde Emissions in the Manufacture of Wood Composites" Forest Products Journal, vol. 46, No. 6, p. 73–77, (1996).

*Primary Examiner*—Duc Truong
(74) *Attorney, Agent, or Firm*—Ladas & Parry

(57) ABSTRACT

Phenol/aldehyde resins particularly phenol/formaldehyde resins are manufactured by replacing a proportion of the phenol content by a mixture of at least two different natural materials having a phenolic content. The resulting resins which can be used in bonding composite materials are at least as effective as the resin using only phenol and more satisfactory environmentally.

15 Claims, No Drawings

BONDING RESINS

This application claims the benefit of Ser. No. 60/104,784, filed Oct. 19, 1998.

This invention relates to bonding resins and particularly to the use of renewable resources in or as substitutes for formaldehyde-based resins.

The wood products industry is still almost entirely dependent on chemicals derived from petroleum and natural gas for producing the necessary bonding agents. The application of bonding agents enables the use of smaller trees, wood chips, fibers and mill residues to produce various products that meet the consumer needs. As the quality of harvested timber declines due to the shrinking commercial forest land base, the future of wood utilization will require an even higher dependence on bonding agents to convert the limited timber resources into needed products. In view of the environmental strains caused by fossil fuels and chemicals and their inherent vulnerable and limited supply, the efforts to identify other available resources for bonding raw materials have accelerated in the latest decades. Renewable resources are he most promising in this field and much research and development have been devoted in this area.

Formaldehyde-based resins (urea-formaldehyde (UF), phenol-formaldehyde (PF), melanine-formaldehyde (MF), melamine-urea-formaldehyde (MUF), resorcinol-formaldehyde (RF), tannin-formaldehyde (TF) and mixtures thereof) are most commonly applied in composite wood panel manufacture. The components of these resins are mainly derived from oil and/or natural gas. It is the aim of the present application to provide effective resin substitutes derived from natural products such as renewable forest biomass and agricultural residues.

Numerous studies were based on the role of products of natural origin in providing alternative feedstocks for wood adhesives. Chen, C. M., "Gluability of Copolymer Resins Having Higher Replacement of Phenol by Southern Pine Foliage Extracts for Flakeboards and Composite Panels", Holzforschung, 1993, 47 (1), 72–75, "State of the Art Report: Adhesives from Renewable Resources", Holzforschung und Holzverwertung, 1996, 4, 58–60, "A Hulluva Switch: Inventor Finds Value in Peanut Hulls", The University of Georgia, Research Reporter, 12–13, reported that extracts of peanut hulls, pecan nut pith or pine bark and foliage can be used to replace up to 80% of the phenol used for phenol-formaldehyde resins. The extraction process involved several stages and was time-consuming.

Efforts have been made also to utilize the oil obtained by the pyrolysis of biomass or its phenolic fraction to substitute phenol in the production of phenol-formaldehyde resins, Gallivan, R. M., Matschei, P. K., "Fractionation of Oil obtained by Pyrolysis of Lignocellulosic Materials to recover a Phenolic Fraction for use in making Phenol-Formaldehyde Resins", U.S. Pat. No. 4,209,647, 1980; Diebold, J., Power, A., "Engineering Aspects of the cortex Pyrolysis Reactor to Produce Primary Pyrolysis Oil Vapors or Use in Resins and Adhesives", Research in Thermochemical Biomass conversion, Bridgwater, A. V., Kuester, J. L., Elsevier Applied Science, London, 1988, 609–628; Chum, H. L., Diebold, J. P., Scahill, J. W., Johnson, D. K., Black, S., Schroeder, H. A., Kreibich, R. E., "Biomass Pyrolysis Oil Feedstocks for Phenolic Adhesives", Adhesives from Renewable Resources, R. Hemingway and A. Conner, Eds., ACS Symp. Series, No. 385, 1989, 135–151; Chum, H. L., Black, S. K., "Process for Fractionating Fast-Pyrolysis Oils, and Products derived therefrom", U.S. Pat. No. 4,942,269, 1990; Chum, H. L., et alk. "Inexpensive Phenol Replacements from Biomass", Energy from Biomass and Wastes XV, Eds. Klass, D. L., 1991, 531–540. Substitution levels of up to 75% have been reported, however the low amount of phenolic compounds present in the oil necessitates a factionation step, which raises the final product cost.

The spent liquor obtained from the paper manufacturing process, comprising mainly the degradation products of lignin, has been the subject of a large number of studies relating to its applicability in formaldehyde-based adhesive systems (mainly PF-adhesives), Forss, K. J., Fuhrmann, A., "Finnish Plywood, Particleboard, And Fibreboard Made With a Lignin-Base Adhesive", Forest Prod. J., 1979, 29 (7), 36–43; Doering, G. A., Harbor, G., "Lignin Modified Phenol-Formaldehyde Resins", U.S. Pat. No. 5,202,403; Chen, C. M., "Gluability of raft Lignin Copolymer Resins on Bonding Southern Pine Plywood", Holzforschung, 1995, 49 (2), 153–157; Senyo, W. C., Creamer, A. W., Wu, C. F., Lora, J. H., "The Use of Organosolv Lignin to Reduce Press Vent Formaldehyde Emissions in the Manufacture of Wood Composites", Forest Prod. J., 1996, 46 (6), 73–77. Various replacement scenarios have been tested, yet the low reactivity of this Liquor cannot justify its use without including any additional modification steps.

In the use of these materials single products have been employed and attempts to improve performance have been made by modification of the material usually to try and increase the phenolic content.

According to the present invention there is provided a phenol/aldehyde resin system in which a significant proportion of the phenol component conventionally employed in such resin is replaced by a mixture of at least two different natural phenolic materials.

The invention also provides a method of forming composite materials in which a proportion of the phenol/aldehyde resin component is replaced by a phenol/aldehyde resin system of the invention.

An advantage of the invention is that it permits lowering of resin toxicity by use of the natural substitutes now specified instead of toxic petroleum derived phenolic products. Thus the phenol/aldehyde resin system of the invention provides an advantage in that it enables replacement of conventional phenol materials even though the properties of the resin system are not superior to those achieved by normal phenol materials.

The phenol/aldehyde resin systems which can be modified in accordance with this invention are those which are conventional in the manufacture of bonding agents and adhesives. The term "bonding agent" is used generically to include adhesive materials. The most common of these resins is, of course, phenol/formaldehyde but phenol can be replaced by other materials within the generic term phenol for example cresol or resorcinol to the extent that this is conventional in the phenol/aldehyde resin art and formaldehyde can be replaced by certain other aldehydes although this is not so common In the art. Those skilled in the art of using phenol/aldehyde resins will be well aware of the alternatives and combinations available. The choice of phenols and aldehydes will normally be related to the types of resins employed for the bonding of composite products but he invention is also applicable to phenol/aldehyde resins employed in other bonding and adhesive functions.

Each of the natural phenolic materials which are used in part substitution of the phenol component of the conventional phenol/aldehyde resin will be derived from a natural source. The difference between these materials can arise from the nature of the source or from a variation in treatment of the same natural source so as to provide materials with different properties for example the nature of the phenolic compounds or their proportion. Each of the materials will have, however, a significant content of phenolic components. The phenolic content can be free phenols or phenolic groupings in molecules forming part of the material. By phenolic content is meant the presence in the molecular structure of one or more components (eg. polymeric components) of phenol structures, i.e. hydroxy substituted aromatic groupings or molecular groupings exhibiting the characteristic properties of phenols. Phenol may be present but usually the component is a compound with a phenolic grouping. Since the natural materials employed in forming the combinations of the invention are often derived from lignin, a natural polymer containing phenolic groups in the structure, extracts, or modifications of such materials will contain phenolic content. The material can be a natural plant derived material or by-product of processing a natural material. The phenolic content can be the normal content or an enhanced content. Enhancement of the phenolic content can be achieved by various treatments of natural materials, particularly lignins for example extraction or pyrolysis.

Thus each component of the system can be a biomass pyrolysis oil or a spent liquor obtained from a paper manufacturing process or other manufacturing process applied to natural materials which contain phenolic containing components. Thus there could be used extraction products of forest biomass or agricultural residues including tropical species residues.

Although thee invention is directed to at least two different natural phenolic materials there could be more than two materials, each material could comprise a mixture of two or more materials. One very suitable component would be a natural product which contains a significant and large proportion of phenolic material for example certain nut shell oils particularly cashew nut shell liquid. A number of natural product materials and by-products are known which contain significant contents of phenolic components. As mentioned above these can be for example lignins.

It is surprising to find that, by combining at least two different natural materials containing a proportion of phenolic components the resulting combination demonstrates a synergistic effect and enables substitution levels of up to 80% of the phenolic component of a standard formaldehyde-based resin. From another point of view, therefore, the invention lies in the combination of at least two different natural materials, both of which contain phenolic compounds as a substitute for the phenolic component of a phenol/aldehyde resin. It is surprising to find that the simple combination of phenolic materials gave an improvement more than would have been expected by the mere increase in he content of phenolic components. It is surprising to find that combination of natural phenolic materials gives en improvement which is more than would have been expected by the change, particularly any increase in the content of phenolic component.

The different Phenolic components can be simply blended when it is desired to employ them or can be subjected to conditions which cause interaction between the components.

The substitute composition can be used in the synthesis of the resins for bonding the final composite material or can be used in the actual production of composite panel products. Although the invention relates primarily to the formation of composite materials using bonding agents prepared with such combinations, improvements have been found for other bonding or adhesive systems employing formaldehyde-based resins especially phenol-formaldehyde resins.

The compositions of the invention can be used in combination with other natural materials such as tannin to obtain a totally natural resin product.

The amount of the phenolic content materials employed can be determined by adding increasing amounts of one phenolic material to a different material to the point at which a distinct improvement in the bonding properties or adhesiveness is noted, particularly in a cured final composite material. Increasing the content of one phenolic material beyond a certain proportion is not advantageous since the bonding or adhesiveness obtained will not significantly be advantageous over use of normal phenolic materials used in such resins. In other words, the amount of each phenolic material added is determined by the increase in synergistic effect as compared to simply adding one phenolic material to resins. The amounts added can therefore be readily determined by one skilled in the art. Thus adding one material may allow substitution of phenol up to a certain percentage by weight and beyond that a deterioration of the composite product properties is observed. It is surprising to find that the combination of several natural derivatives of phenolic character can allow up to 80% phenol substitution without impairment of the composite properties.

The formaldehyde and/or natural resins of the present invention can be applied in the manufacture of composite panel products such as particleboard, fibreboard [medium density fibreboard (MDF), high density fibreboard (HDF)], oriented strand board (OSB) and plywood.

It is also the subject of the invention to use combinations of the disclosed substitutes with formaldehyde and/or natural resins such as tannin resins and other binders such as polymeric diphenyl-methane diisocyanate (PMDI).

The following examples illustrate the invention without limiting its scone and application.

The Comparative Examples 1 to 3 illustrate the addition of a single phenolic natural material. Example 1 onwards illustrate the mixtures of natural phenolic materials in accordance with the invention.

COMPARATIVE EXAMPLE 1

A series of phenol-formaldehyde resins was synthesised using 0, 10, 20 and 40% substitution of the phenol needed in the formula with the liquid obtained by the pyrolysis of wood residues. The resins were subsequently mixed with wood chips, which were then formed to mats and hot-pressed, to enable the production of 16 mm lab scale particleboards. The resin Level employed was 12% w/w based on wood chips and 2% $K_2CO_3$ w/w based on resin solids was applied, to catalyse resin polymerisation reaction. The pressing temperature and time were 200° C. and 14 s/mm respectively, while the specific press pressure was 3 $Kg/cm^2$. The target board density was 700 $kg/m^3$. Three replicate boards were produced in each case and their properties were subsequently determined. The average values of board properties are presented below:

| % Substitution | 0 | 10 | 20 | 40 |
|---|---|---|---|---|
| IB, $N/mm^{2 (1)}$ | 0.93 | 0.98 | 0.94 | 0.88 |
| Density, $kg/m^3$ | 741 | 748 | 745 | 742 |
| 24 h swelling, % | 16.7 | 16.0 | 16.6 | 19.5 |
| V100, $N/mm^{2 (2)}$ | 0.47 | 0.52 | 0.39 | 0.28 |
| MOR, $N/mm^{2 (3)}$ | 26.4 | 24.4 | 23.3 | 20.1 |
| MOR after test, $N/mm^{2 (4)}$ | 9.6 | 5.2 | 5.2 | 4.3 |

-continued

| % Substitution | 0 | 10 | 20 | 40 |
|---|---|---|---|---|
| HCHO, mg/100 g board | 2.1 | 1.4 | 1.3 | 1.0 |
| Moisture, % | 7.2 | 7.3 | 8.0 | 7.7 |

[1]Internal Bond strength/tensile strength
[2]IB value after boiling of the samples at 100° C. for 2 h
[3]Modulus of Rupture/bending strength
[4]MOR value after boiling of the samples at 100° C. for 2 h The formaldehyde (HCHO) emission was determined by using the Perforator method.

As it can be seen from the above test, the board properties are improved by substituting 10% of phenol with pyrolysis liquid. At 20% substitution the board properties are acceptable, however they are affected negatively when higher amount of phenol is replaced.

COMPARATIVE EXAMPLE 2

A series or phenol-formaldehyde resins was synthesised using 0, 10 and 20% substitution of the phenol needed in the formula with cashew nut shell liquid (CNSL). The resins were subsequently mixed with wood chips, which were then formed to mats and hot-pressed, to enable the production of 16 mm lab scale particleboards. The board production conditions were the same as above. The average values of board properties are presented below:

| % Substitution | 0 | 10 | 20 |
|---|---|---|---|
| IB, N/mm$^2$ | 0.93 | 0.98 | 0.97 |
| Density, kg/m$^3$ | 741 | 751 | 750 |
| 24 h swelling, % | 16.7 | 15.6 | 16.2 |
| V100, N/mm$^2$ | 0.47 | 0.56 | 0.42 |
| MOR, N/mm$^2$ | 26.4 | 27.7 | 24.3 |
| MOR after test, N/mm$^2$ | 8.2 | 8.5 | 9.4 |
| HCHO, mg/100 g | 2.1 | 1.7 | 2.5 |
| Moisture, % | 7.2 | 7.7 | 7.6 |

In this test, the board properties are improved also by substituting 10% of phenol with CNSL but it is obvious that substitution levels higher than 20% have a detrimental effect on board properties.

COMPARATIVE EXAMPLE 3

A series of phenol-formaldehyde resins was synthesised using 0, 5, 10 and 20% substitution of the phenol needed in the formula with spent liquor obtained from the alkaline pulping of wood matter. The resins were subsequently applied in the production of 16 mm lab scale particleboards. The board production conditions were the same as above. The average values of board properties are presented below:

| % Substitution | 0 | 5 | 10 | 20 |
|---|---|---|---|---|
| IB, N/mm$^2$ | 0.87 | 1.02 | 0.96 | 0.55 |
| Density, kg/m$^3$ | 758 | 742 | 746 | 725 |
| 24 h swelling, % | 13.1 | 14.0 | 13.9 | 15.9 |
| V100, N/mm$^2$ | 0.31 | 0.33 | 0.36 | 0.12 |
| MOR, N/mm$^2$ | 19.4 | 24.7 | 22.1 | 16.8 |
| MOR after test, N/mm$^2$ | 7.3 | 7.4 | 6.8 | 4.8 |
| HCHO, mg/100 g board | 2.6 | 2.5 | 1.8 | 1.8 |
| Moisture, % | 7.7 | 7.9 | 8.2 | 7.1 |

The above results indicate that even at 20% substitution of phenol with alkaline pulping spent liquor the board properties are worsened.

EXAMPLE 1

A series of phenol-formaldehyde resins was synthesised using 0, 20 and 40% substitution of the phenol needed in the formula with pyrolysis liquid (PL) and 40% substitution of phenol with a mixture of PL and CNSL as well as with a mixture of PL, CNSL and alkaline pulping spent liquor. (SL). The resins were subsequently applied in the production of 16 mm Lab scale particleboards. The board production conditions were the same as above. The average values of board properties are presented below:

| % Substitution Natural substitutes | 0 0 | 20 PL | 40 PL | 40 PL/CNSL | 40 PL/CNSL/SL |
|---|---|---|---|---|---|
| IB, N/mm$^2$ | 0.82 | 0.55 | 0.55 | 0.77 | 0.88 |
| Density | 728 | 709 | 703 | 714 | 741 |
| 24 h swelling, % | 14.1 | 15.1 | 15.8 | 14.7 | 16.2 |
| V100, N/mm$^2$ | 0.29 | 0.19 | 0.14 | 0.31 | 0.39 |
| MOR, N/mm$^2$ | 24.4 | 21.2 | 20.5 | 27.8 | 27.5 |
| MOR after test, N/mm$^2$ | 7.7 | 7.3 | 6.7 | 6.8 | 7.3 |
| HCHO, mg/100 g board | 2.8 | 2.2 | 2.1 | 1.5 | 1.1 |
| Moisture, % | 8.1 | 8.1 | 7.1 | 7.9 | 8.2 |

The results of this test clearly indicate that the combination of at least two natural derivatives provides a higher level of phenol substitution with optimum board properties as compared to single substitutes applied.

EXAMPLE 2

A series of phenol-formaldehyde resins was synthesised using 0 and 50% substitution of the phenol needed in the formula with a mixture of pyrolysis liquid (PL) and CNSL as well as with a mixture of PL, CNSL and alkaline pulping spent liquor (SL). The resins were subsequently applied in the production of 16 mm lab scale particleboards. The board production conditions were the same as above. The average values of board properties are presented below:

| % Substitution Natural substitutes | 0 0 | 50 PL/CNSL | 50 PL/CNSL/SL |
|---|---|---|---|
| IB, N/mm$^2$ | 0.71 | 0.53 | 0.76 |
| Density, kg/m$^3$ | 736 | 721 | 726 |
| 24 h swelling, % | 17.4 | 19.8 | 18.1 |
| V100, N/mm$^2$ | 0.30 | 0.18 | 0.27 |
| MOR, N/mm$^2$ | 25.2 | 19.7 | 23.5 |
| MOR after test, N/mm$^2$ | 7.4 | 3.4 | 7.0 |
| HCHO, mg/100 g | 2.4 | 2.2 | 1.5 |
| Moisture, % | 8.4 | 6.8 | 7.7 |

The above results confirm all previous findings, since the combination of three different natural derivatives provides a high phenol substitution level with optimum board properties.

EXAMPLE 1

A phenol-formaldehyde resin was synthesised using 40% substitution of the phenol needed in the formula with a mixture of pyrolysis liquid, CNSL and alkaline pulping spent liquor. The resin was further applied in the production of 16 mm lab scale oriented strand board (OSB) in comparison with a standard phenolic resin. The resin level employed was 6.5% w/w based on wood strands and 2% K$_2$CO$_3$ w/w based on resin solids was applied, to catalyse resin polymerisation reaction. Mobilcer730 wax emulsion (60%) was also applied at a quantity of 1% w/w based on wood strands. The pressing temperature and time were 200° C. and 16 s/mm respectively. The target board density was 660 kg/m$^3$. Three replicate boards were produced in each case and their properties were subsequently determined. The average values of board properties are presented below:

| Resin | Standard | 40% of phenol substituted by PL/CNSL/SL |
|---|---|---|
| IB, N/mm$^2$ | 0.55 | 0.55 |
| Density, kg/m$^3$ | 661 | 681 |
| 24 h swelling, % | 19.4 | 18.0 |
| V100, N/mm$^2$ | 0.24 | 0.24 |
| V100 option 2, N/mm$^2$ [1] | 0.44 | 0.52 |
| MOR, N/mm$^2$ | 23.7 | 23.9 |
| MOR after test, N/mm$^2$ | 10.8 | 10.5 |
| HCHO, mg/100 g | 1.19 | 1.11 |
| Moisture, % | 4.27 | 5.29 |

[1]V100 measurement after drying and sanding of the samples

In the case of OSB production, the phenolic resin produced by substituting 40% of phenol with a mixture of PL, CNSL and SL provides boards with properties equivalent to the ones of the standard resin.

EXAMPLE 4

Phenol-formaldehyde resins were synthesised using 0 and 50% substitution of the phenol needed in the formula with a mixture of pyrolysis liquid (PL) and CNSL as well as with a mixture of PL, CNSL and alkaline pulping spent liquor (SL). The resins were further applied in the production of lab scale plywood boards. Three layer composites were produced from ocume veneers, which had been dried to 5–7% moisture prior to plywood production. The glue factor was 150 g/m$^2$ and the quantity of the glue mixture needed to cover each side of the middle veneer, was calculated based on the dimensions of each particular veneer and the gluing mixture concentration. The composites were subjected to a cold pre-pressing at 20° C. and 10 kg/cm$^2$ for 10 min before the hot pressing. The hot pressing took place at 150° C. and the press time was 3 min at 18 Kg/cm$^2$. The composite boards obtained were cut to pieces of 20×10 cm size. Three pieces of each board were immersed in boiling water for 10 24, 48, 72 and 96 hours respectively and then submitted to the knife test. The % wood failure found after the knife test is presented below:

| Resin | Standard | 50% phenol substitution with PL/CNSL | 50% phenol substitution with PL/CNSL/SL |
|---|---|---|---|
| 24 h | 100–100 | 100–100 | 60–100 |
| 48 h | 100–100 | 100–100 | 90–100 |
| 72 h | 100–100 | 100–100 | 100–100 |
| 96 h | 100–100 | 100–100 | 100–100 |

The properties of plywood produced with a phenolic resin, substituted by a mixture of natural derivatives at 50% level (phenol substitution), were found to be equal to the ones or the control. This indicates that properties comparable with those of normal phenol/formaldehyde resins can be achieved using high proportions of natural materials.

What is claimed is:

1. A phenol/aldehyde resin system in which a significant proportion of the phenol component conventionally employed in such resin is replaced by a mixture of at least two natural phenolic differentiable materials obtained from different source materials or by different production techniques.

2. A system according to claim 1 wherein the phenol/aldehyde resin system is a phenol/formaldehyde resin and at least 40% by weight of the phenol component is replaced by the mixture of at least two different natural phenolic materials.

3. A system according to claim 1 wherein the relative proportion of the different natural phenolic materials provides a superiority in bonding properties in a composite product as compared to a resin system in which the phenol component is replaced by the same amount by weight of a single natural phenolic material.

4. A resin system according to claim 1 wherein the different natural phenolic materials are different members of the group biomass pyrolysis oils, cashew nut shell liquid, and alkaline pulping spent liquor.

5. A system according to claim 1 wherein the proportion of phenol component replaced is from 40% to 80% by weight.

6. A resin system according to claim 1 in which resin is combined with another different bonding resin to form the final bonding system.

7. A resin system according to claim 6 in which the other different bonding resin system is selected from tannin resins and/or diphenyl-methane diisocyanate resins.

8. A resin bonding system according to claim 1 which is the bonding system in a composite panel product.

9. A resin according to claim 8 wherein the composite product is a particleboard, a medium density fibreboard, a high density fibreboard, an oriented strand board or plywood.

10. A method of manufacturing a phenol/aldehyde resin system for bonding composite products wherein at least 40% by weight of the phenol in the phenol/aldehyde resin is replaced by a mixture of at least two different natural phenolic materials.

11. In a phenol aldehyde resin suitable for bonding a composite product wherein the resin comprises a petroleum derived phenol component and an aldehyde component, the improvement wherein at least 20% by weight of the phenol component is replaced with a mixture of at least first and second natural phenolic materials with the first natural phenolic material being a natural plant material or a by-product of a natural plant material and the second natural phenolic material being a different natural plant material or by-product of a natural plant material, the at least first and second natural phenolic materials being selected and being present in the resin in respective amounts sufficient to effect a synergistic result in bonding the composite product such that the resin provides improved bonding in the composite product as compared to a resin in which the phenol component is replaced by the same amount by weight of the first or second natural phenolic material singly.

12. The phenol aldehyde resin of claim 11, wherein the first and second natural phenolic materials are different members or by-products of the group consisting of a biomass pyrolysis oil, a cashew nut shell liquid, and alkaline pulping spent liquor.

13. The phenol aldehyde resin of claim 11, wherein at least 40% by weight of the phenol component is replaced with the mixture of the at least first and second natural phenolic materials.

14. The phenol aldehyde resin of claim 13, wherein the phenol component is replaced with a mixture of three different natural phenolic materials or by-products thereof.

15. The phenol aldehyde resin of claim 14, wherein the three different natural phenolic materials respectively comprise a pyrolysis liquid, a cashew nut shell liquid, and an alkaline pulping spent liquor.

* * * * *